United States Patent [19]
Tamamaki et al.

[11] Patent Number: 5,431,704
[45] Date of Patent: Jul. 11, 1995

[54] CERAMIC ABRASIVE GRAINS, METHOD OF PRODUCING THE SAME AND ABRASIVE PRODUCTS MADE OF THE SAME

[75] Inventors: Masahiro Tamamaki; Souichi Fujii; Naruo Suzuki, all of Osaka, Japan

[73] Assignee: Japan Abrasive Co., Ltd., Japan

[21] Appl. No.: 140,521

[22] Filed: Oct. 25, 1993

[30] Foreign Application Priority Data

Oct. 23, 1992 [JP] Japan .................................. 4-286090

[51] Int. Cl.$^6$ ................................................ C09C 1/68
[52] U.S. Cl. ........................................ 51/309; 501/12; 501/127; 501/152; 501/153; 428/404
[58] Field of Search ................. 51/307, 309; 501/12, 501/127, 153, 152; 428/402, 403, 404

[56] References Cited
U.S. PATENT DOCUMENTS

| | | | |
|---|---|---|---|
| 3,802,893 | 4/1974 | Kiger et al. | 51/309 |
| 4,623,364 | 11/1986 | Cottringer et al. | 51/309 |
| 4,881,951 | 11/1989 | Wood et al. | 51/309 |
| 5,007,943 | 4/1991 | Kelly et al. | 51/309 |
| 5,164,348 | 11/1992 | Wood | 501/127 |
| 5,190,567 | 3/1993 | Tamamaki et al. | 51/293 |

*Primary Examiner*—Deborah Jones
*Attorney, Agent, or Firm*—Wenderoth, Lind & Ponack

[57] ABSTRACT

$Al_2O_3$-$Er_2O_3$ ceramic abrasive grains comprising a second phase consisting of aluminum oxides and erbium oxides in the form of reaction products surrounding a first phase and the first phase exclusive of the second phase and substantially consisting of alpha alumina only, the size of the crystal grain consisting of two phases being below 1 micron, which are obtained by a sol-gel process wherein erbium precursor is incorporated before sintering in an amount of 0.05–0.4 wt % in a form of $Er_2O_3$, which is suitable for lapping composition, grinding wheel, grinding disc and coated abrasive articles.

12 Claims, 2 Drawing Sheets

CERAMIC ABRASIVE GRAINS, METHOD OF PRODUCING THE SAME AND ABRASIVE PRODUCTS MADE OF THE SAME

BACKGROUND OF THE INVENTION

1. Field of the Invention

This invention relates to ceramic abrasive grains of the $Al_2O_3$-$Er_2O_3$ system used for grinding wheels, coated abrasives, lapping compositions and so forth and a method of producing the same and further an abrasive product made of the same.

2. Prior Art

Conventionally there has been provided a method for producing a sintered aluminous abrasive grain wherein alumina containing materials such as bayer alumina powder, bauxite powder and so forth are formed into particles with a binder and then sintered at a high temperature of 1600° C. or higher. Another method has been also provided wherein alumina monohydrate used as a raw material is treated by a sol-gel process and sintered at a low temperature of 1500° C. or lower. The former method produces abrasive grains including alpha alumina of a large size such as 3–10 microns and consequently the application thereof is limited to heavy duty grinding. The latter method produces abrasive grains having a crystal size of alpha alumina below 2 microns. There have been provided such methods of producing ceramic abrasive grains based on high density alumina by a sol-gel process as follows.

Japanese Patent Publication No. 1-54300 discloses a sintered alumina abrasive grain produced from a substantially calcium ion- and alkali metal ion-free alumina monohydrate by a sol-gel process. In this technology, it is essential that at least one modifying component is added into a colloidal dispersion of alumina in order to obtain a desirable grinding effect. The modifying component is added in a form of salt. Proposed for the modifying component is at least 10 vol % of zirconia and/or hafnia and at least 1 vol % of spinel derived from alumina and at least one oxide of a metal selected from cobalt, nickel, zinc, or magnesium.

Japanese Patent Publication No. 4-4103, which corresponds to U.S. patent application Ser. No. 572,106 which relates to U.S. Pat. No. 4,623,364, discloses an abrasive grain comprising essentially alpha alumina polycrystalline of high density which forms no cell consisting of the arms extending in a radial direction from the center of the cell and having essentially crystallographically identical orientation, said alpha alumina having a particle size of below 1 micron and said abrasive grain having a hardness of at least 18 Gpa, which is obtained by adding alumina seed crystals to alpha alumina precursor and sintering at 1400° C. or lower. Also disclosed are ceramic bodies having a part of alpha alumina replaced with MgO or zirconia in the form of spinel.

Japanese Patent Publication No. 2-53475 discloses the process for obtaining abrasive grains superior in grinding works made of stainless steels etc. comprising mixing aqueous dispersion of alpha alumina monohydrate with such amount of aqueous dispersion of yttrium compound that at least 0.5 wt % of yttria is included in a product after sintering, setting and drying the mixture, crushing the dried solid to grits, and calcining the grits to remove substantially volatile substances from the grits.

Japanese Patent Application laid open No. 64-11183 which corresponds to U.S. patent application Ser. No. 54619 which relates to U.S. Pat. No. 4,881,951 discloses abrasive grits, method for producing the same and the products made therewith, comprising alpha alumina and a reaction product of aluminium oxide and at least about 0.5 wt %, preferably about 1-30 wt % of rare earth metals selected from the group consisting of praseodymium, samarium, ytterbium, neodymium, lanthanum, gadolinium, cerium, dysprosium, erbium and mixtures of two or more of such rare earth metals.

The International Publication WO 90/08744 discloses the process for producing alpha alumina ceramic bodies or abrasive grains having a crystal size of below 0.2 micron either in average or substantially, comprising effecting the gelation of an alumina sol containing minute alpha alumina crystals, heating the gel from 900° C. to 1100° C. within 90 sec, and holding it at 1,000 to 1,300° C. for a given time.

In Japanese Patent Application laid open No. 2-283661, highly dispersible alpha alumina hydrate is mixed with dilute acid solution, and cerium compound is added in an amount of about 0.01-2 wt % in a form of $CeO_2$ relative to the alumina content. The suspension thus obtained is deaerated and deflocculated and subsequently dried and crushed. Sintering is conducted in course of several stages, including sintering under gas pressure. Thus, fine crystalline ceramic materials consisting of fine crystalline matrix and whisker-like needle crystal including 0.01-2 wt % cerium compound can be obtained.

In accordance with Japanese Patent Application laid open under No. 3-234785 which corresponds to U.S. Pat. No. 5,190,567, there have been disclosed sintered alumina grains having the strength and hardness equal to or higher than conventional abrasive grains, and having superior properties in grinding resistance and wear resistance and superior self-sharpening property in course of grinding, which comprise aluminum oxide in an amount higher than 98 wt % and lithium oxide in an amount of 0.01-1.5 wt %, wherein the crystallization ratio of the alpha alumina crystal is 75-95 % and the alpha alumina crystal size is less than one micron, preferably 0.1-0.5 micron, which are obtained by mixing alumina monohydrate with a lithium compound and optionally with aqueous compound of Mg, Ca, Co, Ni, Cr, Fe, Sl, Zn, Mn, Ti or Zr as grain growth inhibitors or for upgrading the toughness of the grains, treating the mixture with ultrasonic vibration to obtain alumina dispersion, drying and crushing the dispersion and sintering the crushed objects at a temperature of 1100°-1500° C. for ten minutes to 2 hours.

There also have been provided methods for producing abrasive grains based on aluminum-rare earth metal oxides as follows.

U.S. Pat. No. 3,802,893 discloses an abrasion-resistant polycrystalline ceramic having a grain size of from about 2 to about 5 microns and a density of at least 3.90 grams/cc, which consists essentially of about 99.5 wt % to about 99.9 wt % of aluminum oxide, about 0.01 wt % to about 0.25 wt % of magnesium oxide and about 0.01 wt % to about 0.25 wt % of samarium oxide, which is produced by a process comprising blending aluminum oxide, magnesium oxide, samarium oxide, screening the dried mixture to obtain free-flowing powder particles, pressing the dried powder to form a green part having a desired shape, presintering the green part to remove the organics and firing the part in a hydrogen atmosphere at a temperature above about 1500° C. for about 5 hours.

Japanese Patent Application laid open No. 59-102865 discloses the process for producing ceramic tools, comprising mixing 0.05–3.0 wt % of one or more substance selected from the group consisting of $Tb_4O_7$, $Ho_2O_3$, $Er_2O_3$ and $Gd_2O_3$, pressing the dried mixture to a desired shape, sintering the object in an inactive gas to obtain a theoretical density of 95–99% and subjecting the object to a hot isostatic press to obtain a theoritical density above 99.5%.

The following are references where the sintering performance and the fine structure are modified by adding rare earth metals to alumina.

1. In the Ceramic Association Journal(Yogyo-Kyokai-Shi), 87(12), p.632–p. 641, under the title of "Effects of Rare Earth Oxides on Sintering of Alumina", there is described the effects of addition of rare earth metal oxides ($Y_2O_3$, $La_2O_3$, $Sm_2O_3$, $Er_2O_3$) on alumina sintering. It is reported that any one of these substances suppress the densification of alumina up to 1500° C., but at 1500° C. $Sm_2O_3$ and $Er_2O_3$ enhance and $Y_2O_3$ and $La_2O_3$ inhibit the densification respectively. Above 1700° C., all rare earth oxides promote the densification of alumina, especially, the addition of $Er_2O_3$ shows the best promoting effect on the densification.
2. In the Ceramic Association Journal(Yogyo-Kyokai-Shi), 88(9), p.531–p.538, under the title of "Effects of $Er_2O_3$ Addition on Sintering of Alumina", there is described the effects of $Er_2O_3$ and its content on initial stage sintering of alumina. Observation is made as to the addition of $Er_2O_3$ of 0.05–2.00 wt % and it is reported that the addition up to 0.50 wt % accelerates the densification but no remarkable effect is observed above 0.50 wt %.
3. In the Ceramic Association Journal(Yogyo-Kyokai-Shi), 88(11), p.666–p.673, under the title of "Effects of $Er_2O_3$ Addition on Final Stage Sintering of Alumina", there is described the effects of addition of $Er_2O_3$ of 2.00 wt % to alumina, especially the effects on the sintering performance and microstructure on the final stage sintering of alumina. It is reported that the solid state reaction between $Al_2O_3$ and $Er_2O_3$ is completed at 1700° C. and $3Er_2O_3 \cdot 5Al_2O_3$ produced as a secondary ingredient provides an influence such that corundum grains of alumina specimens trap small pores inside of them and the distribution range of grain size tends to extend widely, while specimens containing $Er_2O_3$ trap little pores and provides sintered particles having uniform particle size and high density.

However, these abrasive materials consisting of alumina-spinel, alumina or alumina-rare earth oxide are not satisfactorily accepted from the following viewpoint.

In Japanese Patent Publication No. 1-54300, there exists a modifying component such as at least 10 vol % of zirconia and/or hafnia and at least 1 vol % of spinel derived from alumina and at least one oxide of a metal selected from cobalt, nickel, zinc, or magnesium, between alumina particles as main component, so that the hardness of the abrasive grains is as low as below 18GPa while commercial fused alumina abrasive materials have the hardness of 20–22 GPa. The reason for reduction of the hardness is conjectured to be that the hardness of said modifying component is lower than that of corundum, for the hardness of $ZrO_2$ or $HfO_2$ is about 10–12 GPa and the hardness of the spinel derived from alumina and at least one oxide of a metal selected from cobalt, nickel, zinc, or magnesium is 14–18 GPa.

In Japanese Patent Publication No. 4-4103, the hardness is reported to be above 18 GPa (above 20–21 GPa in Embodiments). But, the abrasive grain is composed of a single crystal phase comprising essentially alpha alumina polycrystalline of high density which forms no cell consisting of the arms extending in a radial direction from the center of the cell and having essentially crystallographically identical orientations, so that it is difficult to prevent forming micro-pores on the crystalline grain boundaries and also it is difficult to relax the thermal stress caused in course of grinding. As a result, the grinding property for grinding hardly ground materials such as stainless steels, titanium steels, high nickel alloys, aluminum and so forth is inferior. Besides, when the alpha alumina is partly replaced with magnesium or zirconia of spinel, hardness reduction is unavoidable as well.

In Japanese Patent Publication No. 2-53475 and Japanese Patent Application laid open No. 64-11183, the reaction product, that is aluminum oxide-rare earth metal oxide is produced by mixing aluminum oxide and rare earth metal oxide. The addition of Y, Gd and Dy yields garnets (of cubic structure), while the addition of Pr, Sm, Yb and Er yields perovskites (of orthorhombic structure, garnets may be partly included). Such mineral phases, according to observation by a transmission electron microscope, are included in the ring structure which encircles an alpha alumina crystal domain as well as alpha alumina crystal domain. For example the addition of $Y_2O_3$ composes the mineral phase of yttrium-aluminium garnet(garnet phase: $3Y_2O_3 \cdot 5Al_2O_3$) which is included in the ring structure encircling the alpha alumina crystal domain and also included in the alpha alumina crystal domain of 1–1.5 microns in diameter. Ceramic abrasive grains of this crystal structure are superior in grinding difficult to grind materials such as stainless steels, titanium steels, high nickel alloys and aluminum. However, said alpha alumina crystal domain is as large as 1–1.5 microns in diameter, so that the self-sharpening property obtained by fine crystals is reduced. As a result the grinding property deteriorates. Furthermore, such structure requires at least about 0.5 wt % (preferably about 1–30 wt %) of rare earth metal oxides which forms a garnet phase and perovskite phase of lower hardness as compared with alpha alumina in the alpha alumina crystal domain as a first phase, so that the reduction of hardness is unavoidable. One of the reasons the crystal particle size becomes large is the high sintering temperature. Higher content of rare earth oxide in the aluminum-rare earth metal oxide is hardly sintered, so that the sintering temperature shall be raised to promote the density of the ceramic particles. Higher sintering temperature is not practical in industrial production. In addition the rare earth oxides are too expensive to use in large quantities for abrasive materials.

In International Publication No. WO 90/08744, alumina sol containing minute alpha alumina crystals is gelatinized and sintering is performed under prearranged conditions for obtaining a product having a crystal size of below 0.2 micron in average, density of at least 95% of theoretical density and hardness of above 2000 kg/mm². The resultant alpha alumina abrasive grains are of high strength and high toughness and of high grinding property. But, as in the case of Japanese Patent Publication No. 4-4103, said grains consist of single alpha alumina phase only, so that the relaxation of the thermal stress caused in course of grinding is not expected.

Japanese Patent Application laid open No. 2-283661 tried to solve the above defects by adding cerium compound of about 0.01-2 wt % in a form of $CeO_2$ relative to the alumina content to obtain ceramic materials consisting of fine crystal matrix and whisker-like needle crystals. However, further improvement is expected to produce a more satisfactory result and besides, the production method is troublesome because it includes a complicated sintering process under gas-pressure.

Japanese Patent Application laid open No. 3-234785 solves most part of defects in the conventional technology by adding lithium oxide in an amount of 0.01-1.5 wt % in a final product to aluminium oxide, because the addition of lithium source promotes the nucleation of alpha alumina without the addition of spinel components or alpha alumina seed crystals and besides lowers the transition temperature (from theta alumina to alpha alumina) of the dried gel of alumina dispersion, so that the transition can be easily promoted and sintered alumina abrasive grains having a dense, uniform and fine crystal structure is obtained. However, the abrasive grains are substantially composed of a single crystal phase comprising essentially alpha alumina polycrystalline of high density having the alpha alumina particle size of below 1 micron, and consequently it is difficult to relax the thermal stress caused in course of grinding.

U.S. Pat. No. 3,802,893 and Japanese Patent Application laid open No. 59-102865 suggests that physical properties of the ceramic bodies consisting mainly of aluminum oxide can be improved by adding some rare earth metals or oxides thereof at a given amount ($Sm_2O_3$: about 0.01-0.25 wt %, or $Tb_4O_7$, $Ho_2O_3$, $Er_2O_3$ and $Gd_2O_3$: 0.05-3.0 wt %). However, such prior art relates to ceramics or ceramic tools which are effective for cutting knives, and there is no suggestion of effectiveness in ceramic abrasive grains.

In the aforesaid three Ceramic Association Journals (Yogyo-Kyokai-Shi), the effects of addition of rare earth oxides ($Y_2O_3$, $La_2O_3$, $Sm_2O_3$, $Er_2O_3$) on sintering of alumina are studied and the acceleration effect of $Sm_2O_3$ and $Er_2O_3$ on sintering is observed. Especially in the addition of $Er_2O_3$ of 0.05-2.00 wt %, the addition up to 0.50 wt % accelerates the densification. However, such literature are thoroughly academic papers. As seen from the experimental processes described therein, reagents are used as starting materials (alpha alumina: purity 99.99%, average grain size: 0.2 micron; $Er_2O_3$: purity 99.9%, average grain size: 0.5 micron) and after subjecting the object to hydrostatic press sintering is conducted at above 1500° C. using a high temperature furnace and consequently ceramic materials are obtained. There is, however, no suggestion of the effectiveness for producing ceramic abrasive grains. Namely, disclosed therein are ceramic materials of high mechanical strength which are obtained by using high-purity materials, preventing anomalous grains from occurring and inhibiting grain growth. There is no suggestion as to whether the product has a self-sharpening property, which is required for abrasive grains, that is, the property of contributing to grinding and self-wearing to reproduce fresh cutting edges, in addition to the regular properties such as hardness and strength.

As described above, the research on ceramic materials does not suggest the applicability to abrasive grains. Furthermore, the conventional ceramic abrasive grains are not satisfactory in hardness, grain strength (toughness), self-sharpening property and relaxation of thermal stress caused in the course of grinding, so that they are not fully satisfactory to grind the difficultly ground materials such as stainless steels, titanium steels, high nickel alloys, aluminum and so forth.

SUMMARY OF THE INVENTION

It is therefore the object of the present invention to solve the aforesaid defects and to provide $Al_2O_3$-$Er_2O_3$ ceramic abrasive grains which are superior in the hardness, the grain strength(toughness), self-sharpening property and relaxation of the thermal stress caused in course of grinding.

It is also an object of the present invention to provide the method of producing the same in an efficient and stable manner and to provide abrasive products made with the same.

In order to attain the above objects, we have developed a novel ceramic abrasive grain comprising a crystal grain with two phases, the second phase of which consists of aluminum oxides and erbium oxides in the form of reaction products surrounding a first phase and the first phase exclusive of the second phase consisting essentially of alpha alumina, the size of the crystal grain consisting of two phases being below 1 micron, preferably below 0.5 micron. The resultant grains are superior in hardness and grain strength (toughness) as well as self-sharpening property derived from micro fracture of fine crystals and also superior in the relaxation of the thermal stress caused in the course of grinding by virtue of the second phase of rim shape which surrounds the first phase.

Namely $Al_2O_3$-$Er_2O_3$ ceramic abrasive grains in accordance with the present invention are characterized in that they are composed of the second phase consisting of aluminum oxides and erbium oxides in the form of reaction products surrounding the first phase and the first phase exclusive of the second phase and substantially consisting of alpha alumina only, and that the crystal grain size is below one micron.

DETAILED DESCRIPTION OF TEE INVENTION

Figure 2:
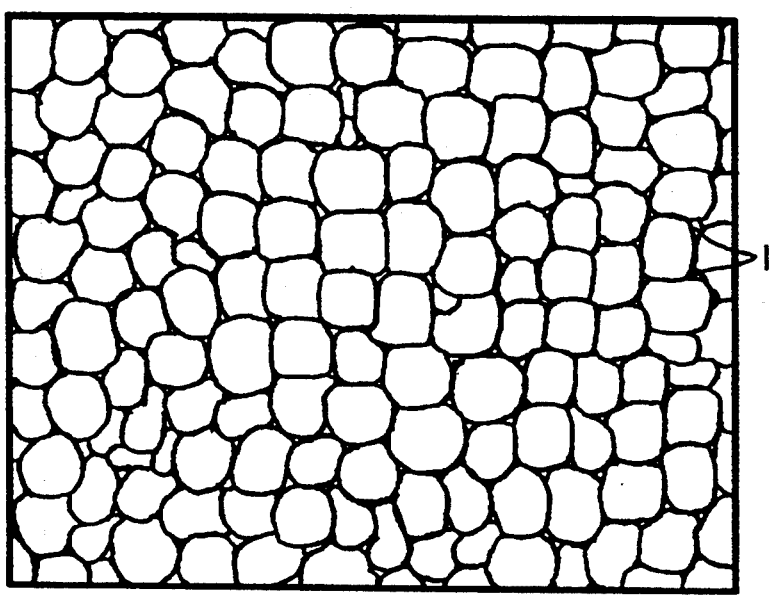
FIG. 2 is a diagrammatically view based on a photo of conventional alumina ceramic abrasive grains by a sol-gel process, which is taken using a scanning electron microscope (photo magnification: thirty thousand)

Conventional ceramic abrasive grains consisting of alumina-zirconia or alumina-spinel are inferior in hardness as described above. On the other hand, the ceramic abrasive grains essentially consisting of alumina only are composed of a single phase of high density polycrystalline phase having the particle size of below one micron as shown in FIG. 2 when observed using a scanning electron microscope of thirty thousand magnifications. Micro-pores 1 usually exist on the crystal grain boundaries and besides the relaxation of the thermal stress caused in course of grinding is not expected.

Figure 3:
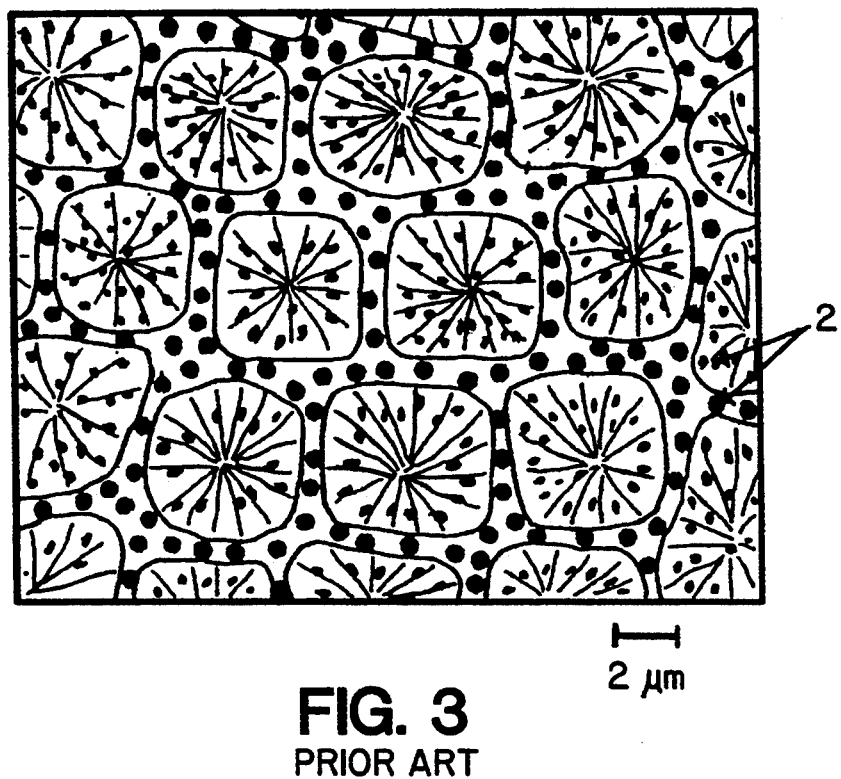
FIG. 3 is a diagrammatical view based on a photo of conventional alumina-rare earth ceramic abrasive grains by a sol-gel process, which is taken using a polarizing microscope (photo magnification: one thousand).

Ceramic abrasive grains composed of alumina-yttria or alumina-rare earth oxides are superior in preventing the occurrence of micro-pores and relaxing the thermal stress in course of grinding by virtue of the existence of a second phase composed of composite compounds of the materials in a first phase of alpha alumina or crystal boundaries thereof. When observed using a polarizing microscope of one thousand magnifications, however, the crystal grain size is far larger than 1 micron, as shown in FIG. 3, so that the self-sharpening property is inferior. In addition the hardness is low because the volume percentage of the composite compounds 2 is large.

Having made clear these problems, the present invention provides ceramic abrasive grains comprising a second phase consisting of aluminum oxides and erbium oxides in the form of reaction products surrounding a first phase and the first phase exclusive of the second phase and substantially consisting of alpha alumina only, the size of the crystal grain consisting of two phases being below 1 micron, preferably below 0.5 micron and thereby provides novel ceramic abrasive grains which are superior in hardness and grain strength(toughness) as well as self-sharpening property derived from micro fracture of fine crystals and also superior in the relaxation of the thermal stress caused in course of grinding by virtue of the second phase of rim shape which surrounds the first phase.

The reason for adoption of two-phase structure is that the existence of the second phase composed of different mineral compositions in addition to the first phase of alpha alumina relaxes the thermal stress caused in course of grinding. The term "rim" denotes a reaction rim, that is a structure of minerals surrounding other minerals concentrically.

The crystal grain size is preferred to be below one micron, more preferably below 0.5 micron. In case the grain size is above one micron, the grinding force increases and the grains wear badly to loose the self-sharpening property, because the reproduction of the cutting edges in course of grinding is made at every crystal grain.

The thickness of the second phase surrounding the first phase of alpha alumina and consisting of aluminum oxide and erbium oxide is preferred to be below 0.1 micron. In case the thickness is above 0.1 micron, the hardness and strength (toughness) are inferior as mentioned above.

The additive amount of erbium oxide is preferred to be in the range of 0.05–0.4 wt % to obtain 0.1–1 vol % of the second phase consisting of aluminum oxide and erbium oxide. Namely, when the additive amount of erbium oxide is up to 0.4 wt %, the volume percentage of either $Er_2O_3-Al_2O_3$ (density: about 7.5 g/cm$^3$) of orthorhombic system or $3Er_2O_3 \cdot 5Al_2O_3$ (density: about 8.6 g/cm$^3$) of cubic system becomes below about 1 vol %, so that the hardness is not as low as below 22G pa which is the hardness of alumina proper ($\alpha$-$Al_2O_3$: corundum) i.e. corundum monoclinic. Besides they do not substantially exist in the first phase of alpha alumina but exist in the form of rim surrounding the first phase, so that the hardness of the first phase is not reduced. Erbium oxides can be added up to about 2 wt%, but the upper limit is taken as 0.4 wt %, because erbium oxides are too expensive to use in large quantities and moreover the addition of above 0.4 wt % raises the sintering temperature, produces the second phase consisting of aluminum oxide and erbium oxide in the first phase of alpha alumina or increases the thickness of the second phase surrounding the first phase and consequently the hardness and strength(toughness) is inferior.

In addition to the above, the existence of 0.01–1.5 wt % of lithium oxide is effective to enhance the nucleation of alpha alumina, reduce the sintering temperature and increase the density of ceramic abrasive grains. Instead of erbium oxide($Er_2O_3$), one oxide selected from the group consisting of Y, Ce, Yb, Gd, Sm, La, Nd or the combination of such rare earth oxides may be also used. In this case too, when the total amount is far over 0.4 wt %, there occurs the reduction of the grain hardness and toughness. As for the modifying components for the alpha alumina first phase, at least one oxide of a metal selected from the group consisting of Mg, Ca, Co, Nl, Cr, Fe, Sl, Zn, Mn, Ti and Zr can be added in a small amount without deteriorating the properties of the ceramic abrasive grains.

As for the method for producing the ceramic abrasive grains according to the present invention, there may be provided such method as preparing fine powders of aluminum oxides and erbium oxides of below 0.1 micron as starting materials, mixing the materials well, forming the materials into a shaped body and sintering the body using a hot press, CIP, HIP and a gas plasma at a high temperature for a short time. However, a sol-gel process is more effective in an industrial mass production, which comprises mixing water, aluminum monohydrate and acid, drying and crushing a resultant dispersion and sintering crushed objects at 1100°–1500° C., wherein erbium precursor forming the second phase in the form of reaction product of aluminum oxide and erbium oxide in the abrasive grain is incorporated in an amount of 0.05–0.4 wt % in a form of $Er_2O_3$. More preferably presintering is conducted at 900°–1300° C. before sintering in order to obtain the relative density of above 80% and then the erbium precursor is incorporated.

The ceramic abrasive grains according to the present invention can be used as lapping composition of fine lapping. Furthermore, when sintered at a temperature of below 1000° C. or 250° C. with organic bonds or inorganic bonds, grinding wheels and sanding discs may be obtained. With organic bonds such as resinoid bonds, coated abrasive articles may be obtained.

Now, the method of producing the ceramic abrasive grains in accordance with the present invention is described herein in detail in order of manufacturing process.

1. Preparation of colloidal dispersion

Colloidal dispersion is prepared by mixing water, an alumina source, an erbium source, acid and optionally a lithium source. Mixing is performed using a well-known mixer or mill such as vibromill, ball mill, homogenizer etc. It is preferred to apply a lining in order to avoid the inclusion of impurities originated from a crushing means. Balls are preferably coated with polytetrafluoroethylene and the like. Water to be used is not necessarily limited, but ion exchange water is preferred in order to obtain a high quality of dispersion. Of course, the inclusion of contaminants shall be avoided as much as possible.

Alumina materials are selected from alumina monohydrate, pseudo-Boehmite and amorphous alumina monohydrate, pseudo-Boehmite and amorphous alumina monohydrate, which are commercially available under the trade designation of "Pural", "Disperal" and "Catapal". For an erbium source, erbium precursor such as water soluble $Er(NO_3)_3$, $ErCl_3$ is preferred. The erbium content in the product is 0.05–0.4 wt % in a form of oxide. Less content than 0.05 wt % is ineffective. Higher content than 0.4 wt % is not preferred from the above described reasons. More preferable content of erbium is 0.1–0.3 wt % in a form of oxide.

Acids used as a deflocculant include nitric, hydrochloric, acetic acid and mixed acid thereof. The amount of acids is determined so that a pH value of the dispersion become 2–4. Lithium source for facilitating the nucleation of alpha alumina, for reducing the transition temperature of alumina crystal and for obtaining uniform and dense crystal structure is preferred to be water soluble compounds, as in the case of erbium source, such as $LiNO_3$, $LiCl$ etc. Solid content of the colloidal dispersion can be controlled within the range of 5–40 wt %. When mixing is made with a high solid content, particularly with the content of higher than about 20 wt %, the viscosity of dispersion is increased so that uniform dispersion is difficult. But the viscosity drops when the dispersion is made at a temperature higher than 40° C., so that the preparation of a uniform dispersion is easy.

Some of alumina materials are less dispersable. In this case, nondispersive particles may be removed using a classifier such as hydro-cyclone to obtain high quality of products. In case ceramic abrasive grains having extremely fine crystal structure are desired as final products, the dispersion obtained as above may be further treated with a ultrasonic vibration.

2. Drying, crushing, classifying of the dispersion

Erbium containing dispersion is dried to obtain a dried gel. The dried gel obtained is then crushed and classified into desired grades. The drier may be any type of drying apparatus such as hot-air drying machine and vacuum drying machine. The dispersion is spread with a thickness of a few centimeters on a stainless bat and is dried statically at a temperature lower than 15° C. to remove water completely. A dispersion may be extruded in a desired shape using a extruding machine or other general forming machine and is dried at a temperature lower than 150° C. The lower a drying temperature is, the higher the density of grains. Practical temperature shall be decided in view of productivity. Apart from the temperature and pressure, drying shall be made under the conditions that no bubbles occur in the dispersion.

Crushing is made until a desired particle size is obtained by a well known crushing device such as roll crusher, ball mill or impeller breaker.

Classifying may be made by a well known mesh screen such as a vibration sifter and particles of undesired size are returned to the initial process for preparing the colloidal dispersion.

3. Sintering

Sintering is performed by any kind of furnace such as a rotary kiln, muffle furnace or tunnel furnace. Before sintering, classified grains are calcined at a temperature of 500°–600° C. to remove water of crystallization and acids. Sintering temperature is preferred to be 1100°–1500° C. When the sintering temperature is lower than 1100° C., there is obtained neither $Er_2O_3 \cdot Al_2O_3$ (orthorhombic structure) or $3Er_2O_3 \cdot 5Al_2O_3$ (cubic structure) consisting of aluminum oxide and erbium oxide, but rather $Er_2O_3$ only as second phase. As a result, the density is low and the strength (toughness) is inferior. In case the temperature exceeds 1500° C., the crystal size of alpha alumina first phase becomes larger than 2 microns. Heating or cooling rate and keeping time are not limited. It is preferred to take a long keeping time when sintering is performed at a low temperature, and a short keeping time at a high temperature. Selection may be usually made within the range of 10 minutes to 2 hours. Sintering is preferred to be performed in a non-reducing atmosphere. When sintering is performed by a batch furnace, the thickness of grains is preferred to be less than 20 mm so as to obtain uniform crystal size of alpha alumina first phase of each grain.

4. Method of incorporating erbium precursor

The erbium precursor is incorporated by the addition to the starting dispersion as described in above item 1. Otherwise, the erbium precursor may be incorporated at any one of stages of wet gel, dried gel, calcined product and presintered product or at two or more stages including starting dispersion. For example, in case erbium is added to dried gels, the aforesaid water soluble erbium precursor such as $Er(NO_3)_3$, $ErCl_3$, or erbium oxide powders in alcohol solution is impregnated to the crushed and classified dried gels. Erbium is added to the classified products having a uniform distribution of the grain size, so that the amount of expensive erbium is eliminated. Impregnation of erbium may be also applied to calcined products or presintered products. Calcined products are prepared at a calcination temperature of 500°–600° C. and presintered products are prepared at a presintering temperature of 900°–1300° C. Suitable concentration of erbium solution is determined by observing the porosity of dried gels, calcined products or presintered products. When the presintering is made at the above temperature, a relative density of higher than 80% is obtained. Accordingly, it is preferred to impregnate the erbium solution into the presintered products since the impregnation can be performed uniformly with a small amount of erbium. More preferable addition of erbium can be made when the impregnation is performed after vacuum degassing of the products.

Figure 1:
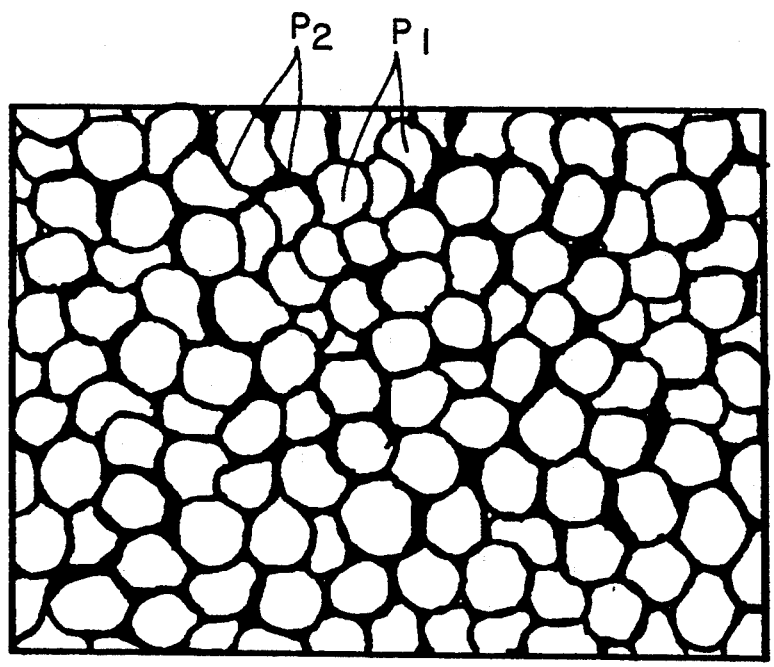
FIG. 1 is a diagrammatical view based on a photo of the $Al_2O_3$-$Er_2O_3$ ceramic abrasive grains in accordance with the present invention, which is taken using a high resolution micro-analysis electron probe (transmission electron microscope, photo magnification: one hundred thousand)

The crystal structure of $Al_2O_3$–$Er_2O_3$ ceramic abrasive grains according to the invention is shown in FIG. 1, which was observed with a hundred thousand magnification using a 200 kV high-resolution electron probe microanalyzer (transmission electron microscope). In said figure, the crystal size of the alpha alumina first phase $P_1$ appearing gray or dark gray is about 0.2 micron and the crystal size of the second phase $P_2$ appearing white, which is consisted of aluminum oxide and erbium oxide and surrounding the first phase $P_1$ in the form of reaction rim is about 0.02 micron. The size of the crystal grain consisting of said two phases is about 0.3 micron. Thus the remarkable difference can be observed between the $Al_2O_3$–$Er_2O_3$ ceramic abrasive grains in accordance with the present invention and conventional abrasive grains such as $Al_2O_3$ abrasive grains, $Al_2O_3$–$ZrO_2$ abrasive grains, spinel abrasive grains, or rare earth abrasive grains.

The ceramic abrasive grains in accordance with the present invention, which comprise a second phase consisting of aluminum oxides and erbium oxides in the form of reaction products surrounding a first phase and the first phase exclusive of the second phase and substantially consisting of alpha alumina only, the size of the crystal grain consisting of two phases being below 1 micron, preferably below 0.5 micron, are desired $Al_2O_3$–$Er_2O_3$ ceramic abrasive grains which enhance the hardness and grain strength (toughness), self-sharpening property by virtue of micro fracture of fine crystals and relaxation of thermal stress caused in course of grinding by virtue of the existence of second phase surrounding the first phase in the form of rim. As a result the ceramic abrasive grains obtained in the present invention can be effectively applied to grinding of difficulty ground materials such as stainless steels, titanium steels, high nickel alloys, aluminum and so forth, as well as regular steels.

The desired $Al_2O_3$-$Er_2O_3$ ceramic abrasive grains can be provided in an efficient and stable manner in accordance with the present invention by taking a sol-gel process using hydrate alumina particles and hydrate erbium particles having a small average crystal size.

EXAMPLES

The present invention will now be explained in detail according to the following examples.

Example 1

Catapal alumina presented by Vista Chemical Company as alumina source, erbium nitrate($Er(No_3)_3$) as erbium source, lithium nitrate ($LiNO_3$) as lithium source, concentrated nitric acid(61%) as deflocculant and ion exchange water are used to prepare the composition as shown in Table 1.

Said compositions were charged into a stainless steel pot mill coated with polytetrafluoroethylene and mixed for 24 hours using steel balls coated with polyurethane as a crushing means to obtain a colloidal dispersion.

Each dispersion was then spread in a stainless steel tray with the thickness of 2–3 cm and dried with a hot-air drying machine for 2 hours at 80° C. to obtain glass like material, i.e. dried gel. Said dried gel was crushed repeatedly with a roll crusher until the particle size became below 0.5 mm. Crushed objects thus obtained were classified into 0.5–0.18 mm using a vibration sifter. Undesired fine particles of below 0.18 mm could be dispersed again.

Each classified particles was then inserted into a crucible made of alumina($Al_2O_3$, purity 98%) with the thickness of 15 mm and calcined at 500° C. for 12 hours at a heating rate of 5° C./min. in an oxidizing atmosphere using an electric furnace and thereby water of crystallization and nitric acid ion were removed. Then sintering was performed at a heating rate of 10° C./min. at the temperature and for the keeping time as shown in Table 1.

The composition of ceramic abrasive grains thus obtained, size of crystal grain consisting of the first phase and second phase, thickness and mineral composition of the second phase, relative density, rickets hardness, grain strength(strength per grit #60), strength per grit after a thermal shock test are shown in Table 1.

The determination of mineral components was conducted using a RAD-RC X-ray powder diffractometer of RIGAKUSHA under the condition of tube voltage/tube current : 50 kV/200 mA. To determine the existence of erbium compound in alpha alumina first phase, a high resolution electron probe micro-analyser of HITACHI and an energy dispersive X-ray spectrometer of HORIBA were used. Measurements of strength per grit were conducted on the grains #60 (300–250 microns) using a testing machine (AUTOGRAPE of Shimazu Corporation). Thermal shock test was conducted for confirming the relaxation of thermal stress in course of grinding by keeping the grits #60 at 1100° C. for 10 minutes in EREMA furnace and then cooling rapidly in water.

Table 2 represents comparative examples prepared in the same manner and Table 3 shows the embodiments of impregnation method in accordance with the present invention.

TABLE 1

| Sample No. | | 1 | 2 | 3 | 4 | 5 | 6 | 7 | 8 | 9 | 10 | 11 | 12 |
|---|---|---|---|---|---|---|---|---|---|---|---|---|---|
| Composition | ion exchange water (l) | 40 | 40 | 40 | 40 | 40 | 40 | 40 | 40 | 40 | 40 | 40 | 40 |
| | Catapal alumina (kg) | 8 | 8 | 8 | 8 | 8 | 8 | 8 | 8 | 8 | 8 | 8 | 8 |
| | $Er(NO_3).6H_2O$ (g) | 0.24 | 0.48 | 0.97 | 1.45 | 1.93 | 0.97 | 0.97 | 0.97 | 0.97 | 0.97 | 0.97 | 0.97 |
| | $LiNO_3$ (g) | 0 | 0 | 0 | 0 | 0 | 0 | 0 | 0 | 0 | 0 | 0 | 0 |
| | $HNO_3$ (ml) | 700 | 700 | 700 | 700 | 700 | 700 | 700 | 700 | 700 | 700 | 700 | 700 |
| pH of dispersion | | 3.3 | 3.3 | 3.3 | 3.3 | 3.3 | 3.3 | 3.3 | 3.3 | 3.3 | 3.3 | 3.3 | 3.3 |
| Sintering | sintering temperature (°C.) | 1350 | 1350 | 1350 | 1350 | 1350 | 1350 | 1350 | 1350 | 1350 | 1350 | 1400 | 1400 |
| | keeping time (min.) | 30 | 30 | 30 | 30 | 30 | 30 | 120 | 20 | 60 | 120 | 60 | 5 |
| Abrasive grain | | | | | | | | | | | | | |
| components (%) | $Al_2O_3$ | 99.6 | 99.6 | 99.5 | 99.4 | 99.2 | 99.3 | 99.4 | 99.4 | 99.4 | 99.4 | 99.4 | 99.4 |
| | $Er_2O_3$ | 0.05 | 0.10 | 0.20 | 0.30 | 0.40 | 0.20 | 0.20 | 0.20 | 0.20 | 0.20 | 0.20 | 0.20 |
| | $Li_2O$ | 0 | 0 | 0 | 0 | 0 | 0.05 | 0 | 0 | 0 | 0 | 0 | 0 |
| crystal grain size (μm) (average Particle diameter) | | 0.19 | 0.20 | 0.21 | 0.25 | 0.32 | 0.20 | 0.28 | 0.19 | 0.28 | 0.42 | 0.36 | 0.38 |
| thickness of second phase (μm) | | 0.01 | 0.01 | 0.02 | 0.02 | 0.05 | 0.02 | 0.02 | 0.02 | 0.02 | 0.03 | 0.02 | 0.03 |
| existence of Er in first phase | | — | — | — | — | — | — | — | — | — | — | — | — |
| mineral component in second phase (X-ray diffraction)* | | C,P | C,P | C,P,G | C,P,G | C,P,G | C,P,G | C,P,G | C,P,G | C,P,G | C,P,G | C,P,G | C,P,G |
| relative density | | 97.8 | 98.2 | 98.6 | 99.0 | 98.8 | 99.2 | 98.9 | 98.3 | 99.2 | 99.5 | 99.0 | 99.0 |
| vickers hardness (GPa) | | 22.0 | 22.5 | 22.5 | 22.5 | 22.0 | 23.0 | 22.5 | 22.5 | 22.5 | 22.0 | 22.0 | 22.0 |
| strength per grit (kg/piece) | | 2.6 | 2.7 | 2.6 | 2.5 | 2.6 | 2.8 | 2.6 | 2.5 | 2.5 | 2.6 | 2.5 | 2.5 |
| strength per grit after thermal shock test (kg/piece) | | 2.0 | 2.3 | 2.3 | 2.3 | 2.2 | 2.2 | 2.0 | 2.1 | 2.2 | 2.2 | 2.1 | 2.0 |

*C: $\alpha$-$Al_2O_3$
P: $Er_2O_3.Al_2O_3$
G: $3Er_2O_3.5Al_2O_3$

TABLE 2

| Sample No. | | COMPARATIVE EXAMPLES | | | | | | | | | | |
|---|---|---|---|---|---|---|---|---|---|---|---|---|
| | | 13 | 14 | 15 | 16 | 17 | 18 | 19 | 20 | 21 | 22 | 23 |
| Composition | ion exchange water (l) | 40 | 40 | 40 | 40 | 40 | 40 | 40 | 40 | 40 | 40 | 40 |
| | Catapal alumina (kg) | 8 | 8 | 8 | 8 | 8 | 8 | 8 | 8 | 8 | 8 | 8 |
| | $Er(NO_3) \cdot 6H_2O$ (g) | 0 | 0.10 | 2.41 | 4.83 | 9.65 | 0.97 | 0.97 | 0.97 | 0.97 | 0.97 | 0 |
| | $LiNO_3$ (g) | 0 | 0 | 0 | 0 | 0 | 516.8 | 0 | 0 | 0 | 0 | 7.8 |
| | $HNO_3$ (ml) | 700 | 700 | 700 | 700 | 700 | 700 | 700 | 700 | 700 | 700 | 700 |
| pH of dispersion | | 3.4 | 3.3 | 3.3 | 3.2 | 3.1 | 3.1 | 3.3 | 3.3 | 3.3 | 3.3 | 3.3 |
| Sintering | sintering temperature (°C.) | 1350 | 1350 | 1350 | 1350 | 1350 | 1350 | 1050 | 1350 | 1400 | 1500 | 1350 |
| | keeping time (min.) | 30 | 30 | 30 | 30 | 30 | 30 | 240 | 240 | 240 | 30 | 30 |
| Abrasive grain | | | | | | | | | | | | |
| components (%) | $Al_2O_3$ | 99.7 | 99.7 | 99.2 | 98.3 | 97.4 | 97.5 | 99.6 | 99.6 | 99.6 | 99.6 | 99.6 |
| | $Er_2O_3$ | 0 | 0.03 | 0.50 | 1.0 | 2.0 | 0.20 | 0.20 | 0.20 | 0.20 | 0.20 | 0 |
| | $Li_2O$ | 0 | 0 | 0 | 0 | 0 | 2.0 | 0 | 0 | 0 | 0 | 0.03 |
| crystal grain size (μm) (average particle diameter) | | 2.5 | 1.1 | 1.1 | 1.8 | 2.4 | 3.8 | 0.21 | 0.74 | 1.3 | 2.1 | 0.23 |
| thickness of second phase (μm) | | 0 | 0.01 | 0.11 | 0.12 | 0.21 | 0.10 | 0.01 | 0.02 | 0.02 | 0.02 | 0 |
| existence of Er in first phase | | — | — | detect | detect | detect | — | — | — | — | — | — |
| mineral component in second phase (X-ray diffraction)* | | C | C | C,P,G,E | C,P,G,E | C,P,G,E | C,P,G,L | C,P,E | C,P,G | C,P,G | C,P,G | C |
| relative density | | 89.5 | 92.4 | 94.8 | 94.2 | 91.0 | 92.0 | 90.4 | 99.2 | 99.8 | 99.6 | 99.2 |
| vickers hardness (GPa) | | 15.0 | 20.0 | 20.5 | 20.0 | 19.5 | 19.5 | 19.0 | 20.0 | 20.5 | 21.0 | 21.0 |
| strength per grit (kg/piece) | | 1.9 | 2.1 | 2.4 | 2.3 | 2.1 | 2.1 | 2.0 | 2.2 | 2.5 | 2.4 | 2.5 |
| strength per grit after thermal shock test (kg/piece) | | 1.0 | 1.3 | 1.8 | 1.7 | 1.7 | 1.5 | 1.3 | 1.7 | 1.8 | 1.8 | 1.3 |

*C: $\alpha$-$Al_2O_3$
P: $Er_2O_3 \cdot Al_2O_3$
G: $3Er_2O_3 \cdot 5Al_2O_3$
L: $LiAl_2O_3$
E: $Er_2O_3$

TABLE 3

| | EMBODIMENT | | | | |
|---|---|---|---|---|---|
| Sample No. | | 24 | 25 | 26 | 27 |
| Composition | ion exchange water (l) | 40 | 40 | 40 | 40 |
| | Catapal alumina (kg) | 8 | 8 | 8 | 8 |
| | $HNO_3$ (ml) | 700 | 700 | 700 | 700 |
| pH of dispersion | | 3.4 | 3.4 | 3.4 | 3.4 |
| Impregnation | process (impregnation method) | calcined products | presintered products | | |
| | treatment temperature (°C.) | 600 | 950 | 1100 | 1250 |
| | keeping time (min.) | 240 | 120 | 60 | 10 |
| | relative density | 53.0 | 64.5 | 78.5 | 82.0 |
| | $Er(NO_3)_3 6H_2O$ solution concentration (%) | 2.0 | 2.5 | 2.9 | 3.3 |
| | impregnation amount (ml) | 50 | 40 | 35 | 30 |
| Sintering | sintering temperature(°C.) | 1350 | 1350 | 1350 | 1350 |
| | keeping time (min.) | 30 | 30 | 30 | 30 |
| Abrasive grain | components (%) | | | | |
| | $Al_2O_3$ | 99.4 | 99.4 | 99.4 | 99.4 |
| | $Er_2O_3$ | 0.20 | 0.20 | 0.20 | 0.20 |
| | crystal grain size (μm) (average particle diameter) | 0.19 | 0.19 | 0.18 | 0.18 |
| | thickness of second phase(μm) | 0.02 | 0.02 | 0.02 | 0.02 |
| | existence of Er in first phase | — | — | — | — |
| | mineral component in second phase(X-ray diffraction)* | C,P,G | C,P,G | C,P,G | C,P,G |
| | relative density | 97.9 | 98.5 | 99.0 | 99.2 |
| | vickers hardness (GPa) | 22.0 | 22.5 | 23.0 | 23.0 |
| | strength per grit (kg/piece) | 2.5 | 2.6 | 2.7 | 2.8 |
| | strength per grit after thermal shock test (kg/piece) | 2.1 | 2.3 | 2.4 | 2.5 |

*C: $\alpha$-$Al_2O_3$
P: $Er_2O_3 \cdot Al_2O_3$
G: $3Er_2O_3 \cdot 5Al_2O_3$

In sample Nos. 1–12 and Nos. 24–27, there have been obtained abrasive grains comprising the second phase consisting of aluminum oxides and erbium oxides in the form of reaction products surrounding a first phase and the first phase exclusive of the second phase and substantially consisting of alpha alumina only, the size of the crystal grain consisting of two phases being below 1 micron. The mineral components of grains obtained were $\alpha$-$Al_2O_3$, $Er_2O_3$--$Al_2O_3$ (orthorhombic system) and $3Er_2O_3 \cdot 5Al_2O_3$ (cubic system). As for the physical properties of grains obtained, the relative density was above 97.5%, vickers hardness was as high as above 21 GPa, the strength per grit was approximately equal to or somewhat higher than comparative examples and the strength per grit after the thermal shock test was remarkably enhanced.

Sample No. 27 presintered at 1250° C. for 10 minutes shows high relative density of 82% and the abrasive grains obtained by subjecting the presintered product to impregnation and sintering process showed superior properties.

Sample Nos. 13 and 14 in comparative examples include no $Er_2O_3$ or a trace of $Er_2O_3$, so that the crystal grains size is large and the relative density as well as the hardness is low. On the contrary, sample Nos. 15–17 include $Er_2O_3$ in a large amount, so that the thickness of the second phase consisted of aluminum oxide and erbium oxide in the form of reaction rim is as large as above 0.1 micron and the crystal grain size is above 1 micron. Sample No. 18 including 2% of $Li_2O$ yielded $LiAl_5O_8$ which is a compound of $Al_2O_3$ and $Li_2O$ and the crystal grain size is large. As shown in sample Nos. 19–22 sintering temperature of lower than 110° C. yields a low relative density, and keeping time of above 2 hours with sintering temperature of above 1500° C. yields a large crystal grain size of above 1 micron.

Sample No. 23 was prepared in accordance with the embodiment of Japanese patent application laid open under No. 3-234785. The crystal grain size is as small as below 0.3 micron and the relative density and hardness is high by virtue of the existence of 0.03% of $Li_2O$. However, this sample includes no $Er_2O_3$ and no reaction rim consisted of aluminium oxide and erbium oxide, so that the strength per grit after the thermal shock test is reduced in nearly half of the embodiments.

Example 2

Abrasive grains of particle size #89 were obtained by sifting the grains obtained in Example 1 and comparative examples. Vitrified straight wheels of type 1A, 200×10×31.75 mm were obtained by applying a vitrified bond of low melting point to the abrasive grains and sintering the same at 900° C. For comparison purpose, vitrified straight wheels were prepared in a like manner using conventional fused alumina abrasive grains. Works SUJ-2(hardening steel) were ground using the horizontal spindle surface grinding machine PSG-52A of OKAMOTO and the results are shown in Table 4.

Vitrified wheels using embodiment grains showed about six times the grinding ratio of conventional wheels of fused alumina abrasive grains and 1.2–1.4 times the grinding ratio of conventional wheels of ceramic abrasive grains both in dry grinding and wet grinding. Grinding resistance was low, no burn marks and no chatter marks were observed, and a preferable self-sharpening property was observed.

Example 3

Abrasive grains of particle size #46 were obtained by sifting sample Nos. 2, 3, 5, 7, 10 and 27 in Example 1 according to the present invention as well as sample Nos. 13, 17, 18, 23 in comparisons. Resinoid grinding discs of type 1A, 200×10×31.75 mm were obtained by applying a resinoid bond to the abrasive grains. For comparison purpose, resinoid grinding discs were prepared in a like manner using conventional fused alumina abrasive grains. Works SKD-11(dice steels, HRC 60) were ground in wet grinding using the horizontal spindle surface grinding machine PSG-52A of OKAMOTO and the results are shown in Table 5.

TABLE 4

| Grinding wheel | Dry grinding | | | Wet drying | | |
|---|---|---|---|---|---|---|
| | grinding ratio ($mm^3/mm^3$) | grinding resistance (kgf/mm) | | grinding ratio ($mm^3/mm^3$) | grinding resistance (kgf/mm) | |
| | | *Fn | *Ft | | Fn | Ft |
| Embodiments | | | | | | |
| Sample  1 | 58 | 0.3 | 0.1 | 73 | 0.5 | 0.2 |
| No. 2 | 64 | 0.2 | 0.1 | 76 | 0.3 | 0.1 |
| 3 | 67 | 0.2 | 0.1 | 80 | 0.3 | 0.1 |
| 4 | 65 | 0.2 | 0.1 | 78 | 0.3 | 0.1 |
| 5 | 64 | 0.3 | 0.1 | 76 | 0.4 | 0.2 |
| 6 | 68 | 0.2 | 0.1 | 82 | 0.3 | 0.1 |
| 7 | 62 | 0.2 | 0.1 | 73 | 0.3 | 0.1 |
| 8 | 60 | 0.2 | 0.1 | 72 | 0.3 | 0.1 |
| 9 | 64 | 0.2 | 0.1 | 73 | 0.3 | 0.1 |
| 10 | 63 | 0.2 | 0.1 | 72 | 0.3 | 0.1 |
| 11 | 65 | 0.3 | 0.1 | 77 | 0.4 | 0.2 |
| 12 | 65 | 0.3 | 0.1 | 74 | 0.5 | 0.2 |
| 24 | 67 | 0.2 | 0.1 | 76 | 0.3 | 0.1 |
| 25 | 68 | 0.2 | 0.1 | 77 | 0.3 | 0.1 |
| 26 | 68 | 0.2 | 0.1 | 80 | 0.3 | 0.1 |
| 27 | 70 | 0.2 | 0.1 | 82 | 0.3 | 0.1 |
| Comparisons | | | | | | |
| Sample 13 | 9 | 0.2 | 0.1 | 7 | 0.3 | 0.1 |
| No. 14 | 34 | 0.5 | 0.3 | 38 | 1.0 | 0.4 |
| 15 | 45 | 0.3 | 0.1 | 48 | 0.4 | 0.2 |
| 16 | 45 | 0.3 | 0.1 | 50 | 0.4 | 0.2 |
| 17 | 40 | 0.4 | 0.2 | 43 | 0.7 | 0.3 |
| 18 | 28 | 0.6 | 0.3 | 38 | 1.0 | 0.4 |
| 19 | 25 | 0.3 | 0.1 | 32 | 0.5 | 0.2 |
| 20 | 37 | 0.4 | 0.2 | 40 | 0.7 | 0.3 |
| 21 | 40 | 0.5 | 0.3 | 45 | 0.7 | 0.3 |
| 22 | 43 | 0.5 | 0.3 | 50 | 0.8 | 0.3 |
| 23 | 50 | 0.4 | 0.2 | 62 | 0.5 | 0.2 |
| *HA | 10 | 1.0 | 0.4 | 15 | 1.7 | 0.5 |

*HA: conventional crush-type alumina abrasive grains(JIS R 6111)
*Fn:normal grinding force
*Ft:tangential grinding force

TABLE 5

| Grinding disc | Grinding ratio** | Grinding** resistance |
|---|---|---|
| Embodiments | | |
| Sample No.  2 | 530 | 32 |
| 3 | 580 | 30 |
| 7 | 540 | 34 |
| 10 | 560 | 28 |
| 27 | 620 | 26 |
| Comparisons | | |
| Sample No. 13 | 320 | 32 |
| 17 | 380 | 40 |
| 18 | 350 | 52 |
| 23 | 440 | 38 |
| *HA | 100 | 100 |

*HA:conventional crush-type alumina abrasive grains (JIS R 6111)
**Relative ratio taking the grinding ratio and the grinding resistance of HA as being 100

Grinding discs using embodiment grains showed about five times the grinding ratio of conventional discs of fused alumina abrasive grains and 1.2–1.4 times the grinding ratio of conventional discs of ceramic abrasive grains. Grinding resistance was low, no burn mark and no chatter mark were observed, and a preferable self-sharpening property was observed.

Example 4

Abrasive grains of particle size #60 were obtained by sifting sample Nos. 2, 3, 5, 7, 10 and 27 of Example 1 and sample Nos. 13, 17, 18 and 23 of comparisons. Resinold grinding discs were obtained by applying a phenol resinold bond to the abrasive grains and sintering the same at 180° C. For comparison purposes, resinoid grinding discs were prepared in a like manner using conventional fused alumina abrasive grains and fused alumina zirconia abrasive grains. Works S45C(38×500×10 mm) were ground using a motor-driven sander PDH-180 of HITACHI with 4 kg load for 20 minutes. Total stock removal is as shown in Table 6.

Resinold grinding discs using embodiment grains according to the present invention showed about 3.2-2.7 times the grinding ratio of conventional fused alumina-zirconia eutectic abrasive grains and more than 1.2 times the grinding ratio of conventional ceramic abrasive grains.

TABLE 6

| Grinding disc | | Total stock removal (g) |
|---|---|---|
| Embodiments | | |
| Sample No. | 2 | 700 |
| | 3 | 800 |
| | 7 | 750 |
| | 10 | 780 |
| | 27 | 820 |
| Comparisons | | |
| Sample No. | 13 | 400 |
| | 17 | 520 |
| | 18 | 460 |
| | 23 | 580 |
| | *HA | 260 |
| | *Az | 380 |

*HA:conventional crush-type alumina abrasive grains (JIS R 6111)
*AZ:conventional fused alumina-zirconia eutectic abrasive grains.

Example 5

Abrasive grains of particle size #60 were obtained by sifting sample Nos. 2, 3, 5, 7, 10 and 27 in Example 1 and sample Nos. 13, 17, 18 and 23 in comparisons. Abrasive belts were obtained in a usual manner using said abrasive grains, conventional fused alumina abrasive grains and fused alumina-zirconia abrasive grains. The results of grinding test are as shown in Table 7.

Grinding conditions are as follows.
belt size : 100×2500 mm
work : SUS-304
belt speed: 150 m/min.
pressure : 5 kg
time : 10 min.

Abrasive belts using embodiment grains showed 2.8-2.3 times the grinding ratio of conventional fused alumina-zirconia eutectic abrasive grains and 1.3 times the conventional ceramic abrasive grains.

TABLE 7

| Grinding belt | | Total stock removal (g) |
|---|---|---|
| Embodiments | | |
| Sample No. | 2 | 700 |
| | 3 | 320 |
| | 7 | 300 |
| | 10 | 310 |
| | 27 | 330 |
| Comparisons | | |
| Sample No. | 13 | 160 |
| | 17 | 190 |
| | 18 | 180 |
| | 23 | 215 |
| | *HA | 70 |
| | *Az | 120 |

*HA:conventional crush-type alumina abrasive grains (JIS R 6111)
Az:conventional fused alumina-zirconia eutectic abrasive grains As apparent from the above disclosure, the present invention has provided novel ceramic abrasive grains comprising a second phase consisting of aluminum oxides and erbium oxides in the form of reaction products surrounding a first phase and the first phase exclusive of the second phase and substantially consisting of alpha alumina only, the size of the crystal grain consisting of two phases being below 1 micron, preferably below 0.5 micron, which are superior in hardness and grain strength(toughness) as well as self-sharpening property derived from micro fracture of fine crystals and also superior in the relaxation of the thermal stress caused in course of grinding by virtue of the second phase of rim shape which surrounds the first phase.

Lapping composition, grinding wheel, grinding disc and coated abrasive articles using the ceramic abrasive grains of this invention also show superior grinding properties.

The producing method using a sol-gel process, which comprises mixing water, aluminum monohydrate and acid, drying and crushing a resultant dispersion and sintering crushed objects at 1100°-1500° C., wherein the erbium precursor forming the second phase in the form of a reaction product of aluminum oxide and erbium oxide in the abrasive grain is incorporated in an amount of 0.05-0.4 wt % in the form of $Er_2O_3$, can provide desired $Al_2O_3$-$Er_2O_3$ ceramic abrasive grains in an efficient and stable manner.

We claim:

1. $Al_2O_3$-$Er_2O_3$ ceramic abrasive grains comprising a crystal grain consisting of two phases wherein a second phase consisting of aluminum oxides and erbium oxides which form reaction products and surround a first phase, and the first phase exclusive of the second phase consists essentially of alpha alumina, and wherein the size of the crystal grain consisting of two phases is below 1 micron.

2. Ceramic abrasive grains claimed in claim 1, wherein the second phase is $Er_2O_3 \cdot Al_2O_3$ of orthorhombic structure and forms a rim surrounding the first phase of alpha alumina.

3. Ceramic abrasive grains claimed in claim 1, wherein the second phase is substantially $Er_2O_3 \cdot Al_2O_3$ of orthorhombic structure and $3Er_2O_3 \cdot 5Al_2O_3$ of cubic structure and forms a rim surrounding the first phase of alpha alumina.

4. Ceramic abrasive grains claimed in claim 2 or 3, wherein the rim surrounding the first phase of alpha alumina has a thickness of less than 0.1 micron.

5. Ceramic abrasive grains claimed in claim 1, wherein the erbium oxide is present in said grains in an amount of 0.05-0.4 wt % and the second phase consists essentially of aluminum oxide and erbium oxide of 0.1-1 vol %.

6. Ceramic abrasive grains claimed in claim 1, wherein the first and second phase include lithium oxide in an amount of 0.01-1.5 wt %.

7. Ceramic abrasive grains claimed in claim 1, wherein the crystal grain size consisting of two phases is below 0.5 micron.

8. Ceramic abrasive grains claimed in claim 1, wherein said grains have a density of at least 97.5% of theoretical density and a hardness of above 21 GPa.

9. Method of producing ceramic abrasive grains comprising preparing a dispersion obtained by mixing water, alumina monohydrate and acid, drying the dispersion to obtain a dried gel, crushing and calcining the dried gel and sintering the resultant material at a temperature of 1100°-1500° C. for 10 minutes to 2 hours, wherein an erbium precursor is incorporated before sintering so as to provide 0.05–0.4 wt % $Er_2O_3$ in the abrasive grains after sintering.

10. Method of producing ceramic abrasive grains claimed in claim 9, wherein the crushed and calcined dried gel is presintered at a temperature of 900°–1300° C. to obtain a relative density of above 80% and thereafter the erbium precursor is incorporated.

11. Grinding articles obtained by applying an inorganic or organic bond to $Al_2O_3$–$Er_2O_3$ ceramic abrasive grains comprising a crystal grain consisting of two phases wherein a second phase consisting of aluminum oxides and erbium oxides which form reaction products and surround a first phase, and the first phase exclusive of the second phase consists essentially of alpha alumina, and wherein the size of the crystal grain consisting of two phases is below 1 micron.

12. Coated abrasive grains obtained by applying an organic bond to $Al_2O_3$–$Er_2O_3$ ceramic abrasive grains comprising a crystal grain consisting of two phases wherein a second phase consisting of aluminum oxides and erbium oxides which form reaction products and surround a first phase, and the first phase exclusive of the second phase consists essentially of alpha alumina, and wherein the size of the crystal grain consisting of two phases being is 1 micron.

* * * * *